(12) United States Patent
Wiesemann et al.

(10) Patent No.: US 9,352,850 B2
(45) Date of Patent: May 31, 2016

(54) METHOD AND SYSTEM FOR DYNAMICALLY DETERMINING AND DISPLAYING NAVIGATION INFORMATION

(71) Applicant: THE BOEING COMPANY, Chicago, IL (US)

(72) Inventors: Thorsten Wiesemann, Hofheim am Taunus (DE); Patrick R. Wipplinger, Moerfelden-Walldorf (DE); Theodore B. Thompson, Highlands Ranch, CO (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 14/451,147

(22) Filed: Aug. 4, 2014

(65) Prior Publication Data

US 2015/0029045 A1    Jan. 29, 2015

Related U.S. Application Data

(62) Division of application No. 11/868,812, filed on Oct. 8, 2007, now Pat. No. 8,798,818.

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |

(Continued)

(52) U.S. Cl.
CPC ............. *B64D 47/02* (2013.01); *G01C 23/005* (2013.01); *G08G 5/0021* (2013.01); *G08G 5/0091* (2013.01); *G08G 5/025* (2013.01)

(58) Field of Classification Search
USPC .................................................. 701/3, 16, 400
See application file for complete search history.

(56) References Cited

U.S. PATENT DOCUMENTS

| | | | |
|---|---|---|---|
| 5,978,715 A | 11/1999 | Briffe et al. | |
| 6,119,055 A * | 9/2000 | Richman ............... | G08G 5/0013 244/114 R |

(Continued)

FOREIGN PATENT DOCUMENTS

EP    1852683 A2    7/2007

OTHER PUBLICATIONS

European Search Report for corresponding European Patent Application No. 08253229.2-1236, dated Jan. 2, 2013, 6 pages.

(Continued)

*Primary Examiner* — Imran Mustafa
(74) *Attorney, Agent, or Firm* — Patterson + Sheridan, LLP

(57) ABSTRACT

A method and system for dynamically evaluating a quantity of context sensitive information used by an operator of an airborne mobile platform in performing an operational procedure involving said mobile platform, and determining, in real time, a sub-quantity of context sensitive information that pertains to only that sub-quantity of information required by said operator to execute said operational procedure. The sub-quantity of information is then displayed on a display in real time for the operator. The method and system significantly eases the cognitive workload of the operator by enabling the operator to focus on and digest only that sub-quantity of information that is pertinent to performing the operational procedure with the specific type of mobile platform being operated. In one embodiment the sub-quantity of information pertains to minima information for performing an aircraft landing approach operation.

8 Claims, 4 Drawing Sheets

(51) Int. Cl.
  *B64D 47/02* (2006.01)
  *G08G 5/00* (2006.01)
  *G08G 5/02* (2006.01)

(56) References Cited

U.S. PATENT DOCUMENTS

| | | |
|---|---|---|
| 6,438,469 B1 | 8/2002 | Dwyer et al. |
| 6,456,940 B1 | 9/2002 | Higgins |
| 6,710,723 B2 * | 3/2004 | Muller ............... G08G 5/0086 340/961 |
| 6,879,886 B2 | 4/2005 | Wilkins, Jr. et al. |
| 7,089,092 B1 | 8/2006 | Wood et al. |
| 7,516,011 B1 | 4/2009 | Kabel et al. |
| 7,876,238 B2 | 1/2011 | Vandenbergh et al. |
| 2002/0039070 A1 | 4/2002 | Ververs et al. |
| 2003/0193410 A1 * | 10/2003 | Chen ................... G01C 23/005 340/971 |
| 2004/0183695 A1 | 9/2004 | Ruokangas et al. |
| 2004/0246178 A1 | 12/2004 | Smith |
| 2006/0227014 A1 * | 10/2006 | Gannon ............... G01C 23/005 340/972 |
| 2006/0259232 A1 | 11/2006 | Huthoefer et al. |
| 2007/0129857 A1 | 6/2007 | Fortier |
| 2008/0103645 A1 * | 5/2008 | DeMers ............... G01C 21/005 701/14 |
| 2008/0164411 A1 | 7/2008 | Kerr |

OTHER PUBLICATIONS

European Search Report for corresponding European Patent Application No. 08253229.2-1236, dated Dec. 19, 2011, 7 pages.

* cited by examiner

METHOD AND SYSTEM FOR DYNAMICALLY DETERMINING AND DISPLAYING NAVIGATION INFORMATION

CROSS-REFERENCE TO RELATED APPLICATIONS

This application is a divisional application of co-pending U.S. patent application Ser. No. 11/868,812 filed Oct. 8, 2007. The aforementioned related patent application is herein incorporated by reference in its entirety.

FIELD

The present disclosure relates to information management systems and methods, and particularly to a method and system for dynamically evaluating a quantity of context sensitive information available to be displayed to an aircraft pilot and determining a minimum subset of relevant information to be provided to the pilot to enable the pilot to more easily digest the information while operating the aircraft.

BACKGROUND

Statements in this section merely provide background information related to the present disclosure and may not constitute prior art.

Current landing approach information for aeronautical applications is typically depicted on a cockpit display or paper charts to a pilot and/or co-pilot as pre-composed and non-interactive images. Such images typically contain all approach minima related information which are applicable to a specific approach procedure, covering any applicable aircraft categories, any approach landing maneuvers, various missed approach climb gradients, and several component-out conditions of the airport facilities. One exemplary minima chart for "LFSB" (Basle/Mulhouse Airport, France) is illustrated in FIG. 1. Five different RVR (Runway Visual Range) requirements are presented to the pilot for evaluation, together with 10 different visibility figures V1-V10. Two of the RVRs are for ILS (Instrument Landing System) with and without ALS (Approach Lighting System) and two for LOC (Localizer) with and without ALS. In addition, other critical information such as the Decision Height (DH) or Minimum Descent Altitude (MDA) are also indicated for varying airports and airport equipment conditions.

The pilot and/or co-pilot are required to visually and mentally digest and filter the non-relevant information out from that information that applies specifically to the operational situation at hand. For example, if the aircraft being flown is a category "e" aircraft, then the minima information pertaining to the category "A", "B" and "D" aircraft will not be needed by the pilot or co-pilot. As will be appreciated, this can significantly add to the cognitive workload of the pilot and/or co-pilot while the pilot and/or co-pilot are attempting to perform a flight maneuver, such as a landing approach, in the aircraft.

Even within digital Electronic Flight Bag (EFB) devices, the aeronautical approach charts do not allow real-time user interaction to filter 10 information, to alter displayed data or to use real-time and current operational parameters to de-clutter approach charts automatically and dynamically. 8y "de-clutter", it is meant the operation of removing minima information that the pilot does not need, based on real-time weather conditions, real-time airport operational conditions, the specific aircraft being piloted, and various other factors. Alternatively, the "de-clutter" terminology can be thought of as the operation of "masking" certain minima information that the pilot and co-pilot do not need, so that certain information non-pertinent is not presented to the pilot and/or co-pilot. As a result, approach charts typically contain significantly more information than a flight crew requires for executing a landing approach under a certain condition (e.g., aircraft approach category). Even though some present day airlines have custom made paper charts for them that only indicate the aircraft category that is applicable for their flight rules, such charts typically still present information pertaining to a plurality of different airport and/or visibility conditions. Thus, such custom charts still require the pilot and/or co-pilot to cognitively filter out a relatively large amount of information that will not be pertinent to the specific airport and weather conditions that are present at the time an approach is being executed. This can significantly add to the cognitive workload imposed on the pilot and/or co-pilot.

SUMMARY

The present disclosure relates to a method and system for dynamically determining a condensed quantity of context sensitive information pertaining to a mobile platform operational procedure, in real time, from a larger quantity of available context sensitive information, and displaying the condensed quantity of context sensitive information to the mobile platform operator in real time.

In one particular implementation the method includes analyzing context sensitive data, in real time, relating to an operational procedure of an airborne mobile platform to be carried out by an individual operating the airborne mobile platform. A subset of context sensitive information is dynamically determined from a larger quantity of context sensitive information relating to the operational procedure. The subset of context sensitive information is then displayed to the individual operating the airborne mobile platform.

In one specific implementation the context sensitive information comprises minima information relating to a landing approach at a particular airport. The subset of context sensitive information relates to a subset of all the available minima information, and is tailored to only the specific operational and weather conditions present at a particular airport at a given time, as well as the specific type of aircraft and other factors pertaining to the approach. Thus, that portion of minima information that is not pertinent for enabling the pilot and/or co-pilot to execute the approach is filtered out to produce the subset of minima information. The subset of minima information is presented to the pilot and/co-pilot via a display system, in real time, which significantly reduces the cognitive workload of the pilot and/or co-pilot (i.e., particularly the individual who is actually flying the aircraft), and enables the pilot and/or co-pilot to more completely focus their attention on executing the landing approach.

In one specific implementation the subset of context sensitive information may be displayed in two or more different colors on the display to further visually signal to the pilot and/or co-pilot whether the context sensitive information (e.g., minima information) is near a minimum condition or is below a minimum condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. While the following description will reference a "mobile platform", and more specifically an airborne mobile platform such as an aircraft, it will be appreciated that the teachings herein are applicable to the navigation/operation of any type of vessel. For example, the teachings herein could be just as readily applied to operators of marine vessels or land vehicles, where the operator may be required to view a large quantity of context sensitive information and to cognitively process such information before (or while) performing a specific operational procedure. Accordingly, the reference to an "airborne mobile platform" or "aircraft" throughout the following discussion is merely meant to illustrate one potential application of the teachings of the present disclosure.

Figure 2:
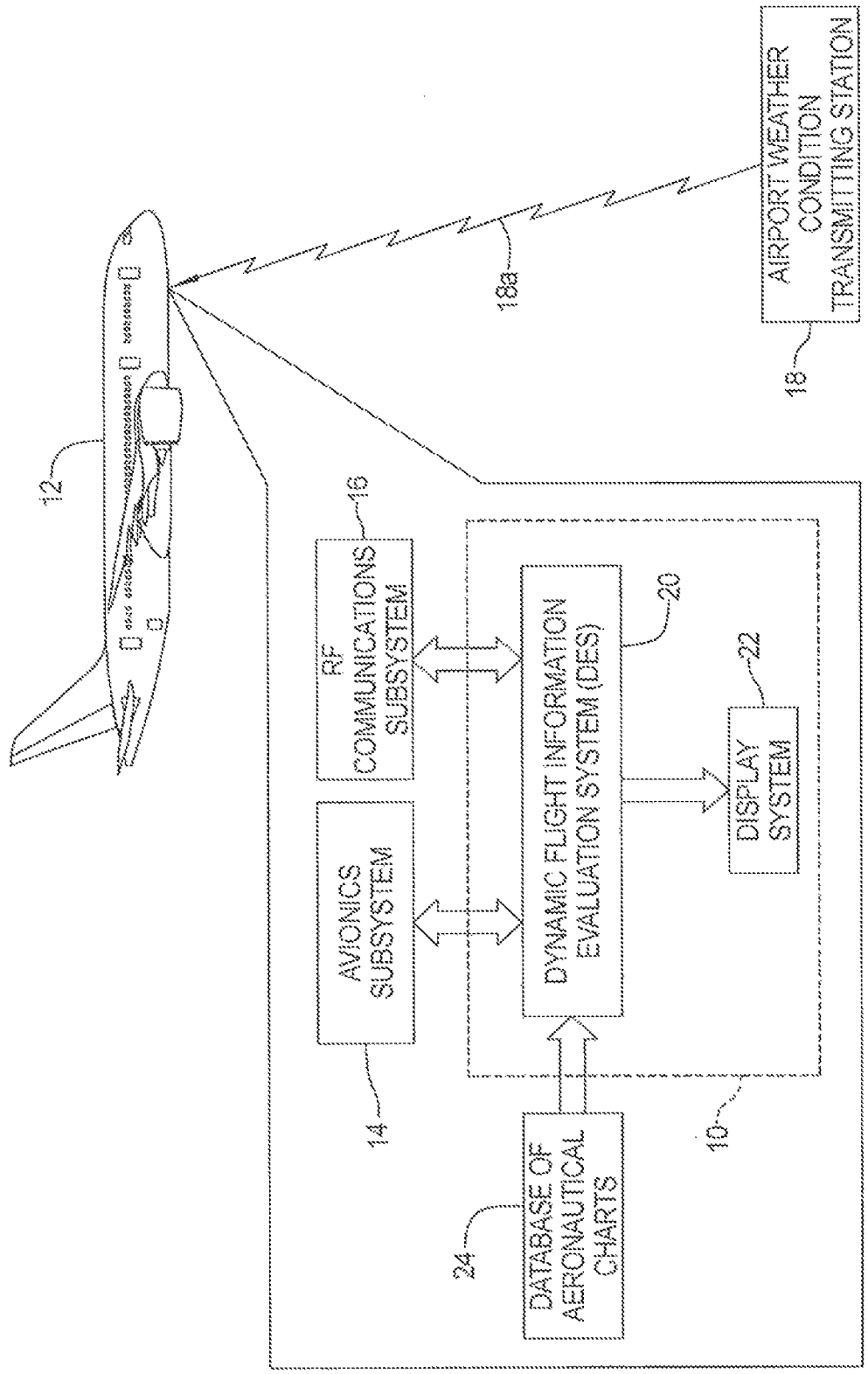
FIG. 2 is a block diagram of one embodiment of a system in accordance with the present disclosure.

Referring to FIG. 2, a system 10 in accordance with one embodiment of the present disclosure is shown. The system is used, in this example, with a vessel that forms an airborne mobile platform. The airborne mobile platform is illustrated as an aircraft 12. The aircraft 12 has an avionics subsystem 14 for generating traditional information (e.g., altitude, airspeed, etc.) for use by other subsystems and for consideration of the flight crew. It is also possible for the system to be employed at a fixed location to dynamically evaluate a large quantity of information or data and to selectively generate only a relevant sub-quantity of information or data that is needed by an individual, in real time, for accomplishing a specific operation or task. Thus, it will be appreciated that the system 10 may find significant utility outside of aerospace and aircraft applications.

Referring further to FIG. 2, the aircraft 12 may typically also include an RF (radio frequency) communications subsystem 16 for receiving information and data from an airport weather/condition information transmitting station 18 via RF signals 18a transmitted from the weather/condition information transmitting station. This information may be used by the pilot (i.e., operator) and/or co-pilot (collectively referred to as the "flight crew"), but in one example, to be explained in greater detail below, it may be input to the system 10 for use by the system in determining (or enhancing) information that is to be displayed.

The system 10 generally includes a dynamic flight information evaluation system 20 (hereinafter after the "DES" 20) and a display system 22. The display system 22 may form a pre-existing display component carried by the aircraft 12 that is used for displaying aeronautical navigation charts stored in a database 24, and particularly landing approach charts. The display system 22 may be directly interfaceable with the DES 20, but in some applications a suitable interface (not shown) may be required. The display system 22 preferably has a color display screen (e.g., either CRT 30 or LCD) that is able to selectively display specific types of information in different colors to even further aid the flight crew in quickly visually assimilating and cognitively processing the information being presented.

Figure 1:
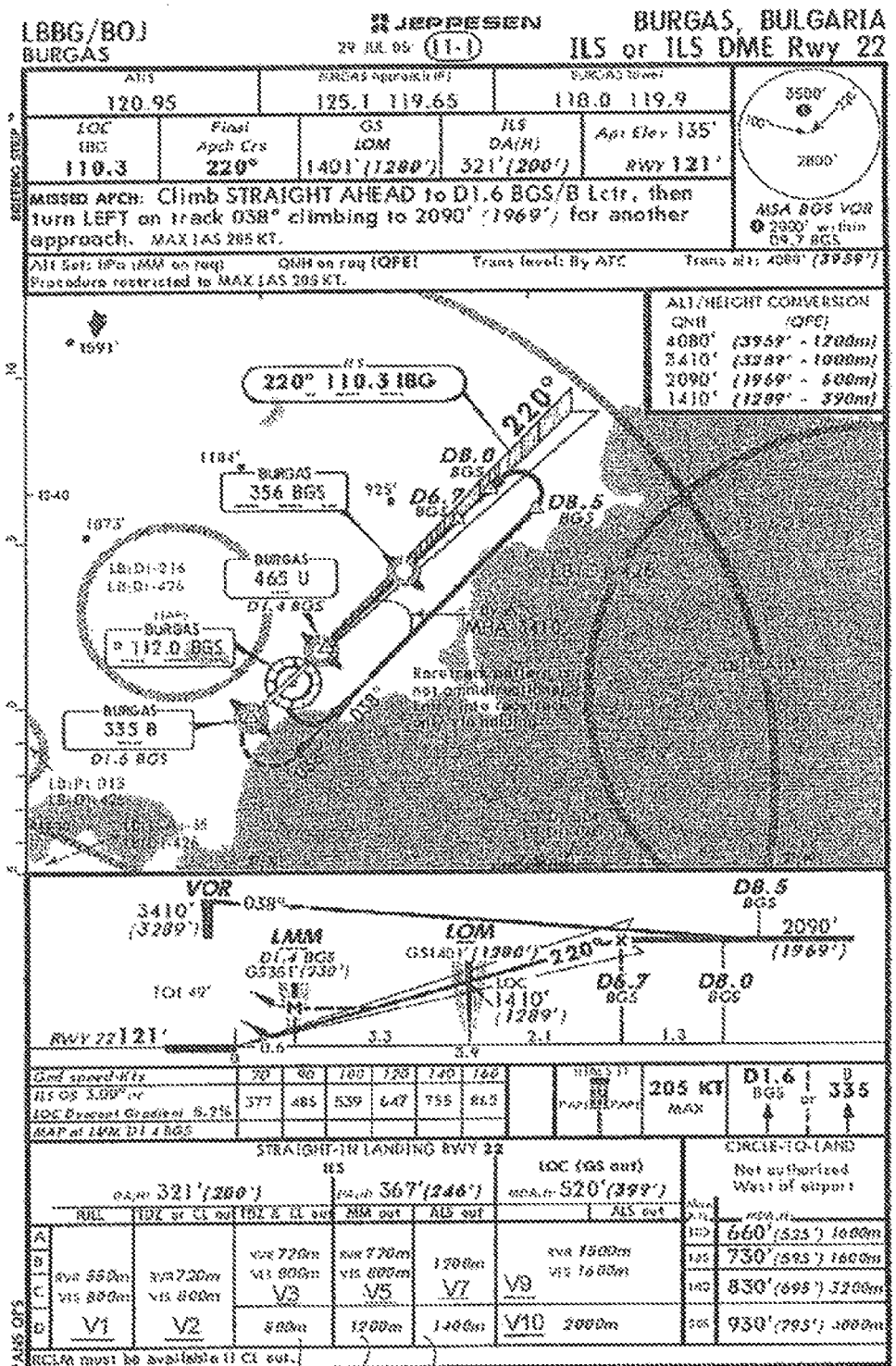
FIG. 1 is a prior art illustration of an aircraft approach chart for Basle/Mulhouse Airport, France (LFSB/MLH)
Figure 4:
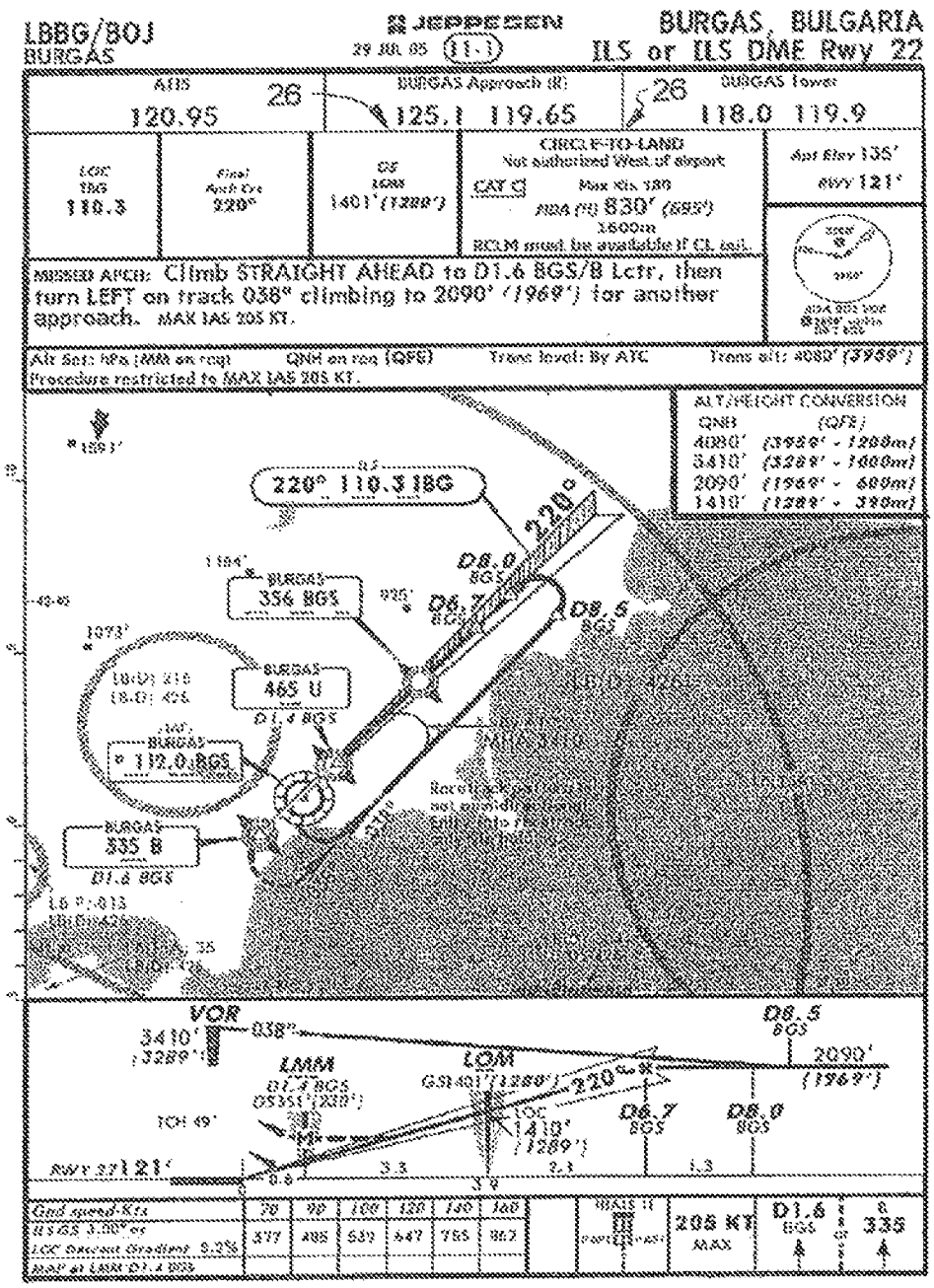
FIG. 4 is an example of an aircraft approach chart having condensed minima information, as may be generated by the present system and method.

In general operation, the DES 20 is loaded with information from the database 24 containing aeronautical information, for example, landing approach charts. Verbal information broadcast from the airport weather/condition information may be converted using any suitable voice recognition software to text information and also input to the DES 20. The DES 20 analyzes this information, together with information from the avionics subsystem 14 to dynamically evaluate what minimum sub-quantity of approach information is required by the flight crew piloting the aircraft 12. In effect, the DES 20 takes a large quantity of approach information (also termed 10 "minima" information) and eliminates portions of the information that are not pertinent, and not required, for the flight crew to consider while executing a landing operation. For example, the approach chart for a given airport may provide several RVR distances for four different types of aircraft, as illustrated in FIG. 1, but if the aircraft 12 is a category "D" aircraft, then only the RVR 15 distances pertaining to a category D aircraft will be pertinent for the flight crew to consider. Additionally, an operator may provide a configuration parameter that selects a given aircraft category as per their Operational Approval that is more restrictive than the minimum requirements (e.g., flying a category D aircraft but using Cat C minimums). Still further, if the Approach Lighting 20 System (ALS) at the airport is working properly, then the RVR corresponding to the ALS "out" condition is irrelevant to the flight crew, and does not need to be displayed on the display 22. And still further yet, if the ALS is operating properly, and a localizer (LOC) is operational at the airport, then a different RVR distance is applicable. Accordingly, it will be appreciated that the DES 20 is able to determine exactly that specific sub-quantity of context sensitive information (e.g., a sub-quantity of minima of the overall available minima) that needs to be presented to the flight crew based on various specific conditions existing at the time an approach is being executed. Such conditions typically will include, without limitation, the specific airport at which the aircraft is landing, the specific aircraft being flown, the specific approach selected or assigned, and whether various lighting and approach systems are available and operational at the airport. The DES 20 may also include, as part of the context sensitive sub-quantity of information selected for display, and without limitation, information originating from the airport weather/condition transmitting station 18. An example of an approach chart that may be displayed on the display system 22 is shown in FIG. 4. In this example the 5 condensed minima is presented at the upper middle area of the chart and denoted by reference numeral 26.

Importantly, the DES 20 determines dynamically, in real time, that specific sub-quantity of pertinent context sensitive information (i.e., pertinent minima) and displays the sub-quantity of information to the flight 10 crew via the display system 22. This significantly reduces the cognitive workload of the flight crew by significantly reducing the amount of available context sensitive information (i.e., minima) that needs to be visually and cognitively processed by the flight crew while executing a landing approach operation. This frees the flight crew to concentrate their attention more fully on executing the landing approach.

Figure 3:
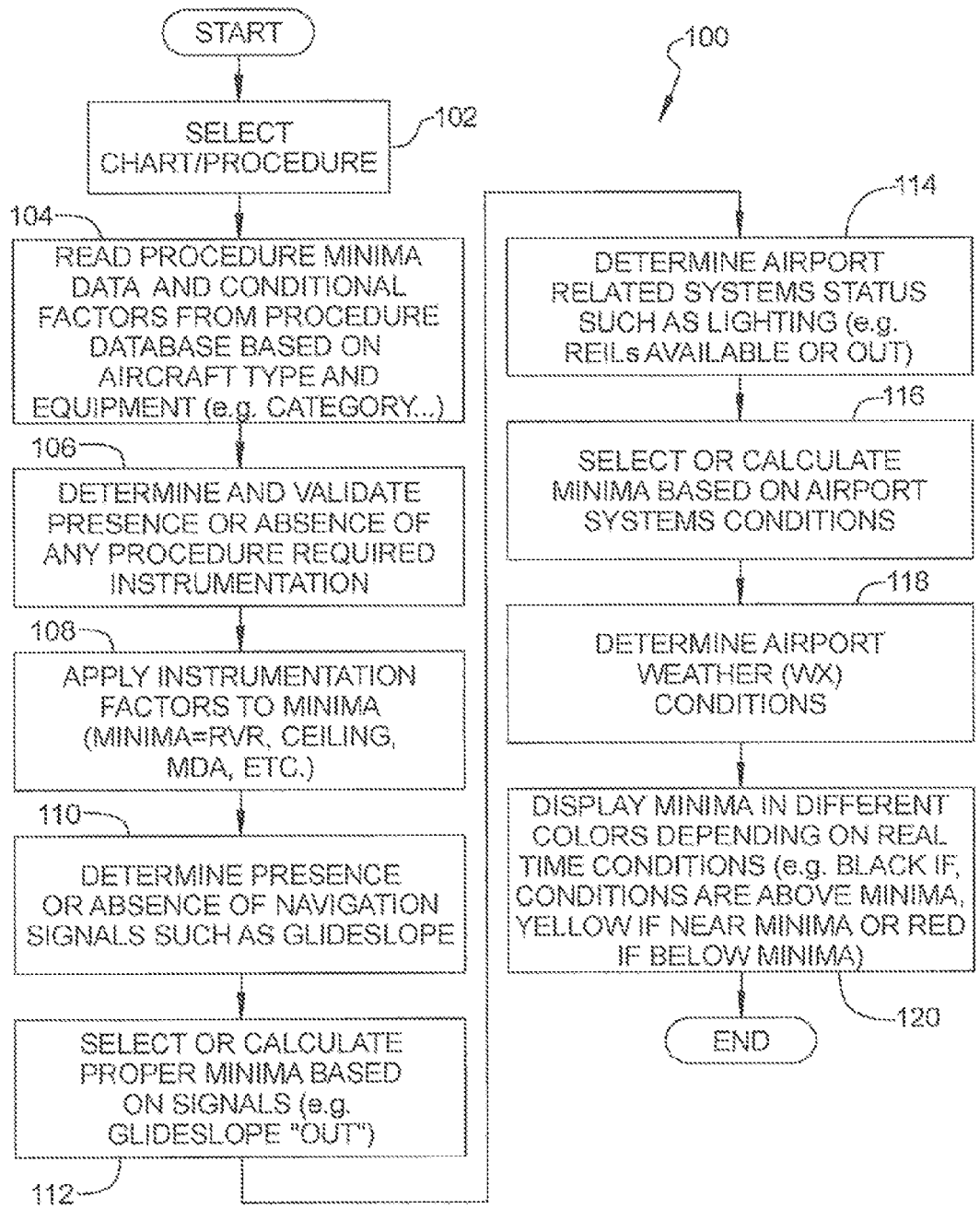
FIG. 3 is a flow diagram of operations performed in accordance with one exemplary implementation of the present disclosure.

Referring to FIG. 3, a more detailed presentation of various operations that may be performed by one implementation of the system 10 is shown in flowchart 100. At operation 102, a particular navigation chart (e.g., an approach chart) may be selected manually by a flight crew member. Alternatively, the selection may be selected automatically by the system 10 based on a particular flight plan and location.

At operation 104, procedure minima data is obtained from the database 24 (FIG. 1) along with any conditional factors that may pertain to the particular flight operation about to be performed. At operation 106, the presence or absence of any procedure required instrumentation is determined and validated. At operation 108, any applicable instrumentation factors are applied to the minima such as the present RVR distance, the minimum descent altitude (MDA) and the Ceiling (altitude at which any cloud cover begins). At operation 110, the system 10 determines the presence or absence of navigation signals such as the Glideslope (GS). The navigation head present on the aircraft mayor may not detect a Glideslope. Different RVR values will apply depending if the Glideslope is operational or not.

At operation 112, the appropriate minima is determined based on which one of the GS "OK" or "out" conditions is present. At this point, the DES 20 may encode the minima data so that it is presented in a particular color on the DES 20. For example, the RVR distance information 5 may be displayed in yellow, red or another color if the GS "out" condition is present. This further visually alerts the flight crew to an important condition existing while the approach is being performed.

At operation 114, airport facility conditions are determined either via a data subchannel of the airport weather/condition transmitting 10 station 18 (typically termed the Automatic Terminal Information Service (ATIS), or via a digital ATIS). Alternatively, information may be entered into the DES 20 by a pilot or co-pilot after listening to an audio transmission received from the airport weather/condition transmitting station 18.

At operation 116, the minima values based on lighting values present at the time the approach is being executed are either calculated or looked up from a suitable table carried in the database 24 (FIG. 1). At operation 118, weather conditions (e.g., RVR, Ceiling, etc.) are determined either via a data sub channel of the airport weather/information transmitting station or entered by a pilot after listening to an audio transmission from the 20 airport weather/condition transmitting station 18.

At operation 120, the minima is displayed (i.e., RVR and Ceiling or MDA/DH (Minimum Descent Altitude/Decision Height>> based on the determinations made in the foregoing operations. Optionally, the minima may be displayed on the display system 22 in black if actual conditions (i.e., RVR, Ceiling) are greater than the minima, in yellow if the actual conditions are near the minima, or in red if actual conditions are below the minima. Other colors or coloring schemes are also possible.

From the foregoing example of a landing approach, it will also be appreciated that certain other factors such as airport weather (WX), Instrument or GS function must be monitored and factored into values during the entire approach procedure. It is preferable that a warning or notification should be shown on the display system 22 if the determined minima should change after the inbound approach procedure has started. Also, it will be appreciated that some changes that occur after the IAF (initial approach fix) has been crossed will cause a display change while other conditions would not change once the approach has started. Also, it will be appreciated that the pilot and/or co-pilot may need to revert to the prior display or be able to fix the display to not change after a certain point in flying the approach.

From the foregoing it will be appreciated that the system 10 and method of the present disclosure significantly reduces the cognitive workload required by flight crew members while executing an approach. The system 10 dynamically determines only that sub-quantity of available minima data that needs to be displayed to the flight crew under a given set of operational and weather conditions existing at the time an approach is being executed, and displays the condensed minima, in real time, on the display system 22. Since the system 10 operates dynamically and in real time, 15 various context sensitive conditions and/or data existing at the time an approach is being executed can be evaluated, in real time, and the subset of minima that is generated by the system 10 will be tailored to the precise airport, weather and various other conditions and/or data existing at the time. It will also be appreciated that the teachings of the present disclosure could 20 be readily adapted to other scenarios where it would be helpful to dynamically evaluate and reduce the amount of visual information provided to an individual (or individuals), in real time, who is/are attempting to perform an operation requiring significant concentration and attention.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for dynamically analyzing a quantity of context sensitive information to determine a relevant sub-quantity of information therefrom to be provided to an operator of an airborne mobile platform, the system comprising:
   a dynamic flight information evaluation system configured to:
   evaluate, in real time, a quantity of available context sensitive information, wherein the quantity of available context sensitive information comprises information from a landing approach chart; and
   eliminate from the quantity a portion of the context sensitive information that is not relevant to enabling the operator of the airborne mobile platform to execute a flight procedure, to produce a sub-quantity of context sensitive information that is relevant to enabling the operator to execute the flight procedure, wherein the sub-quantity of context sensitive information includes real time information broadcast from an Automatic Terminal Information Service (ATIS) relating to an Approach Lighting System (ALS) and a real time Runway Visual Range (RVR) value, that are both encoded into textual information and displayed on the display device as part of the sub-quantity of information, in real time; and
   a display system communicatively connected to the dynamic flight information evaluation system and configured to display, in real time, the sub-quantity of context sensitive information.

2. The system of claim 1, wherein the sub-quantity of the context sensitive information comprises a sub-quantity of information from the landing approach chart that is directly pertinent to the airborne mobile platform being flown by the operator.

3. The system of claim 1, wherein a portion of the textual information is displayed on the display device in a different color from remaining information being displayed on the display device.

4. The system of claim 3, wherein the portion of textual information being displayed in a different color comprises the RVR value, and wherein the RVR value is displayed in a first color when the RVR value is above a predetermined minimum RVR value, and displayed in a second color when the RVR value drops below the predetermined minimum RVR value.

5. A system for dynamically analyzing a condensed quantity of context sensitive information pertaining to a specific category of vessel, selected by an individual operating a vessel that falls within the specific category of vessel, from a larger quantity of available information related to additional categories of vessels different from the specific category of vessel, to determine a relevant sub-quantity of information therefrom to be provided to the operator of the vessel, the system comprising:
  a dynamic context evaluation system configured to:
  analyze context sensitive data relating to:
    an operational procedure of the specific category of vessel to be carried out by the individual operating the vessel;
    a real-time environmental condition existing at a time and at a location that the operational procedure need to be performed; and
    status information supplied from the location relating to a real-time status of a subsystem present at the location;
  dynamically determine, in real time, a subset of context sensitive information suitable for use with the specific category of vessel, in view of the real time environmental condition at the location and the real-time status information obtained from the location relating to the status of the subsystem, the subset of context sensitive information taken from a larger quantity of context sensitive information relating to the operational procedure as applied to the additional categories of vessels; and
  a display system responsive to the dynamic context evaluation system that displays, in real time, the sub-quantity of context sensitive information.

6. The system of claim 5, wherein the specific category of vessel comprises a class of aircraft.

7. The system of claim 6, wherein the context sensitive data related to minima data presented as part of a landing approach chart for the aircraft, and wherein the operation procedure relates to a landing approach for the aircraft.

8. The system of claim 7, wherein the subset of context sensitive information comprises at least one of:
  environmental information at the airport;
  a real time value for runway visual range (RVR) at the airport;
  real time visibility information at the airport;
  a minimum safe altitude (MSA) value;
  a glide slope indication for the landing approach; and
  missed approach information.

* * * * *